United States Patent
Krekeler

[11] 3,888,133
[45] June 10, 1975

[54] CONNECTING PIN AND RETAINING MEANS THEREFOR FOR MINING MACHINE TRIM CHAINS AND THE LIKE

[75] Inventor: Claude B. Krekeler, Cincinnati, Ohio

[73] Assignee: The Cincinnati Mine Machinery Company, Cincinnati, Ohio

[22] Filed: May 30, 1973

[21] Appl. No.: 365,271

[52] U.S. Cl. ............ 74/254; 299/82; 74/250 R
[51] Int. Cl. ............ F16g 13/04; E21c 25/34
[58] Field of Search ...... 74/250 R, 246, 251 R, 254, 74/255 R, 245 R, 250 C, 251 C; 299/82, 83, 84; 403/374, 375, 377; 285/417, DIG. 19

[56] References Cited
UNITED STATES PATENTS

| | | | |
|---|---|---|---|
| 826,991 | 7/1906 | Christ | 74/254 |
| 1,179,060 | 4/1916 | Williamson | 403/375 |
| 1,554,475 | /0000 | Wendell | 403/155 |
| 2,284,565 | 5/1942 | Emmons | 74/251 R |
| 2,802,368 | 8/1957 | Rollins | 74/254 |
| 3,079,188 | 2/1963 | Oswold | 403/377 |
| 3,135,128 | 6/1964 | Rudolph | 74/255 R |
| 3,165,342 | 1/1965 | Anderson | 463/374 |
| 3,309,864 | 3/1967 | Arndt | 74/254 |
| 3,316,771 | 5/1967 | Nichols | 74/250 R |
| 3,679,265 | 7/1972 | Krekeler | 299/84 |

Primary Examiner—Samuel Scott
Assistant Examiner—Allan R. Burke
Attorney, Agent, or Firm—Melville, Strasser, Foster & Hoffman

[57] ABSTRACT

Improved means for joining together the link elements of an endless chain of the type wherein each of the link elements has a transverse perforation at its forward end and at its rearward end and the link elements are arranged in groups. The groups of link elements are located one behind the other with the ends of the link elements of adjacent groups being in interdigitated relationship with their transverse perforations coaxially aligned. The joining means comprises a connecting pin passing through the coaxial perforations of the interdigitated ends of each adjacent pair of link element groups. Each connecting pin has near each end thereof retaining means to prevent axial displacement of that connecting pin during use of the chain. The retaining means at one end at least of the connecting pin comprises a removable retaining means protected from wear from external sources and enabling extraction and insertion of its connecting pin for assembly, disassembly and repair of the chain.

18 Claims, 25 Drawing Figures

CONNECTING PIN AND RETAINING MEANS THEREFOR FOR MINING MACHINE TRIM CHAINS AND THE LIKE

BACKGROUND OF THE INVENTION

1. Field of the Invention

The invention relates to improved connecting pins and retaining means therefor for endless chains, and more particularly to connecting pins and retaining means therefor for use on chains of the type wherein each of the connecting pins passes through coaxial perforations in three or more link elements of the chain.

2. Description of the Prior Art

The connecting pins and associated retaining means of the present invention may have a wide variety of applications. They may be used on substantially any type of chain-like structure wherein the connecting pin is adapted to pass through coaxial perforations in three or more link elements. Such chain structures could comprise conveyor chains, chain-like treads for vehicles, and the like. However, for purposes of an exemplary showing, the invention will be described in its application on trim chains for mining machine.

Non-oscillating drum-type mining machines have come into extensive use. Briefly, such mining machines generally comprise a self-propelled vehicle having a centrally located conveyor means for the material being mined. At the forward end of the machine, one or more movable beams support a horizontally oriented, cutting tool-supporting drum. Frequently, the cutting tools are positioned on the drum in a pattern comprising two oppositely oriented helices which are directed toward the center of the drum. This aids in conducting the cut material toward the center of the machine and its conveyor.

Through an appropriate drive mechanism and gearing, in association with the beam or beams, the drum is caused to rotate about its axis to produce the cutting action. In the usual practice, the machine is brought to the face of the material being cut and the drum is sumped into the face at the top thereof. Thereafter, through the agency of the beam or beams, the rotating drum is caused to move downwardly, making a complete vertical cut at the face of the material. This procedure is then repeated and the mine entry is thereby advanced.

At the position or positions where the drum is supported on one or more of the beams, the drum cannot carry cutting tools. Therefore, one or more trim chains are required to fill in those portions of the drum not otherwise provided with cutting tools. By virtue of the construction of such mining machines, it will be understood that the trim chains have to be of considerable width. As a consequence, such trim chains usually carry a plurality of cutting tools located in patterns of staggered rows extending the width of the chain, so that the chain will make a full width cut.

Heretofore, such trim chains comprised a plurality of chain blocks joined together by two or more connecting links. Each block was as wide as the chain width required and carried at least one cutting tool in a predetermined position along the chain width. Thus, for each cutting tool position there had to be a separate type of chain block configured to mount the cutting tool in that position.

While such chains performed well in the field, they required the mine owner to carry a large inventory of different and expensive chain blocks for purposes of replacement and repair. In addition, if the mine owner had several different non-oscillating drum-type mining machines, each using tirm chains of different widths, he was required to maintain an inventory of sets of chain blocks for each type of machine.

To overcome these difficulties, prior art workers have recently developed chain constructions whereby a trim chain may be made up in any suitable width and length, having any desired cutting tool arrangement thereon, and yet they require the stocking of only a minimum number of standarized parts. Such a chain is taught, for example, in U.S. Pat. No. 3,679,265. Birefly, the chain comprises a plurality of link elements, some of which are connecting links and some of which are links carrying cutting tools. As will be described hereinafter, spacer means can be substituted for selected ones of the connecting links or cutting tool carrying links. As a consequence, the term "link element" as used hereinafter, is to be construed as encompassing connecting links, cutting tool carrying links and spacer means.

The chain is made up of a plurality of transverse rows of link elements in side-by-side relationship with any desired arrangment of connecting links and cutting tool carrying links. The number of elements in each row may be varied so as to provide a chain of any desired width. The ends of the link elements of adjacent rows are interdigitated and held together by connecting pins of appropriate length passing through coaxial perforations in the link element ends. Finally, such chains are driven by sprocket means engaging the ends of selected link elements at selected positions along the width of the chain, or engaging the ends of the connecting pins.

A number of expedients have been used to maintain the connecting pins in position and to prevent the axial shifting thereof. One expedient has been to provide holes in the ends of the outermost link elements on each connecting pin. These holes are adapted to receive set screws, roll pins or the like positioned to ride in annular notches in the connecting pins. While such an arrangement performs adequately, the set screws, roll pins or like fastening means are vulnerable to wear since the link elements are rotatably mounted on the connecting pins and assembly of such chains is difficult since alignment of the annular notches in the connecting pins and the perforations in the endmost links must be achieved.

The above mentioned U.S. Pat. No. 3,679,265 teaches the provision of means at the ends of the connecting pins such as nuts held in position by locking pins. Others have used exterior retaining rings at the connecting pin ends. However, all of these means at the connecting pin ends are subject to wear through contact with the material being cut and are particularly subject to wear if the sprockets driving the chain engage the ends of some or all of the connecting pins. Where retaining rings have been used, they are generally so sized as to have a snap fit into annular grooves at the ends of the connecting pins. However, constant battering of the unprotected retaining rings by the flow of material under pressure cut by the mining machine cutter bits tends to expand the retaining means and frequently results in their loss.

The present invention is directed to connecting pins having retaining means adapted to abut the endmost links of the connecting pins and to be protected from wear from external sources such as the material being cut. In some embodiments the chain may be driven by sprockets contacting the ends of some or all of the connecting pins and the retaining means are protected from wear by the sprockets. At least one retaining means on each connecting pin is readily removable.

The connecting pin and retaining means assemblies of the present invention enable the rapid and easy insertion and removal of the connecting pins whereby the chains may be readily assembled or various link elements may be easily replaced.

SUMMARY OF THE INVENTION

The connecting pin and retaining means assemblies of the present invention are intended for use on that type of chain structure wherein each connecting pin passes through coaxial perforations in three or more link elements. All but one embodiment of the invention contemplate the provision of an annular notch near at least one end of the connecting pin. The annular notch or notches are adapted to receive split metal retaining rings. When retaining rings are used at both ends of the connecting pin, one ring is located in its notch and the pin is then inserted through the coaxial perforations of the link elements it joins. Thereafter, the remaining split metal ring is located in its notch at the other end of the connecting pin.

In certain embodiments, when the connecting pin and its retaining means are fully assembled the retaining rings on the pin are partially or wholly received in annular notches in the coaxial perforations of the endmost link elements. To permit this structure, means are provided for all or selected ones of the connecting pins enabling at least one of the endmost links to shift axially away from one of the annular notches of the connecting pin so that the retaining ring may be inserted therein or removed therefrom. This last mentioned means comprises a spacer or washer-like element. The spacer may be resilient and compressible. The spacer may comprise a third split metal ring adapted to be located on the connecting pin between the two split metal retaining rings after the split metal retaining rings are in place. In yet another version a spacer may be provided in the form of a cylindrical member having two halves joined together by bolts, machine screws or the like. The resilient spacer is compressed enabling location of the retaining ring on the connecting pin. A spacer in the form of a split metal ring or a two piece cylindrical member is properly located on the connecting pin after the retaining ring is in place.

In the above mentioned embodiment utilizing a compressible spacer, the spacer may be so sized as to remain partially compressed after assembly of the connecting pin and retaining means so as to continue to take up and compensate for wear of the link elements and retaining means.

In another embodiment, the retaining means comprises full rings of resilient material. One such ring is located in an annular notch near one end of the connecting pin. The connecting pin is then passed through the coaxial perforations in the link elements it connects. The pin is then further advanced by a force applied axially, compressing the resilient retaining ring thereon, so that a similar resilient retaining ring may be mounted in an annular notch near the other end of the connecting pin. When the axial pressure is removed from the connecting pin, both resilient rings will be located in annular notches in the endmost links.

In yet another embodiment, the retaining ring is made with an initial diameter greater than the diameter of its connecting pin and is so sized as to be compressible wholly within the annular groove in the connecting pin. An annular sleeve with an interior annular notch is located on the connecting pin over the retaining ring. The retaining ring is allowed to expand into the annular groove in the sleeve while remaining partially in the annular notch in the connecting pin. The sleeve protects its retaining ring and the retaining ring-sleeve combination is in abutting relationship with the adjacent chain link.

In a final embodiment, a sleeve identical to the one just described is used, but its annular groove is engaged by rods shiftably mounted in radially oriented holes in the connecting pin end. The radial holes in the connecting pin end communicate with an axial bore in the pin end. The rods are shiftable between sleeve-engaging and sleeve-releasing positions and are held in their sleeve-engaging positions by a removable plug located in the axial bore.

In any or all of the embodiments only one end of the connecting pin need be provided with a removable or releasable retaining means. When desired, the other end of the connecting pin may simply be provided with an internal, permanent shoulder or head. The provision of removable or releasable retaining means on both ends of the connecting pin enables its removal from either edge of the chain.

BRIEF DESCRIPTION OF THE DRAWINGS

FIG. 6 is an elevational view of the split metal spacer ring of the embodiment of FIG. 5.

DESCRIPTION OF THE PREFERRED EMBODIMENTS

Figure 1:
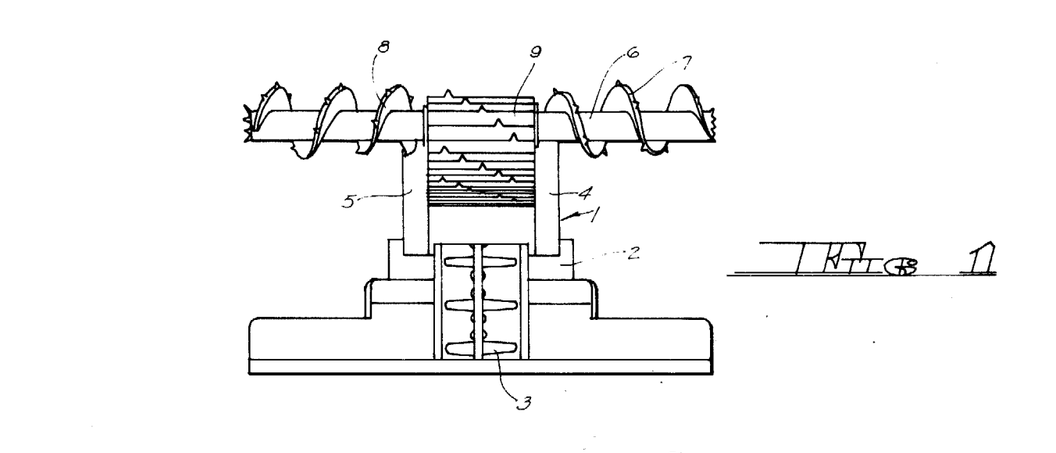
FIG. 1 is a semi-diagrammatic front elevational view of a typical non-oscillating drum-type mining machine.

FIG. 1 is a semi-diagrammatic front view of a nonoscillating drum-type mining machine, generally indicated at 1. The machine has a self-propelled body portion 2 with centrally located conveyor means 3. A pair of spaced, movable beams 4 and 5 support a rotatable drum 6 having two helical rows of cutting tools 7 and 8. Appropriate drive means (not shown) for the drum is located in association with or between the beams 4 and 5. The machine is provided with a trim chain 9 to cut clearance for that portion of the drum which cannot otherwise be equipped with cutter bits, i.e., that portion of the drum which must be supported by the beams 4 and 5 and that portion operatively connected to the drive mechanism for the drum. The trim chain may be driven by any suitable means such as sprocket wheels or the like (not shown).

Figure 2:
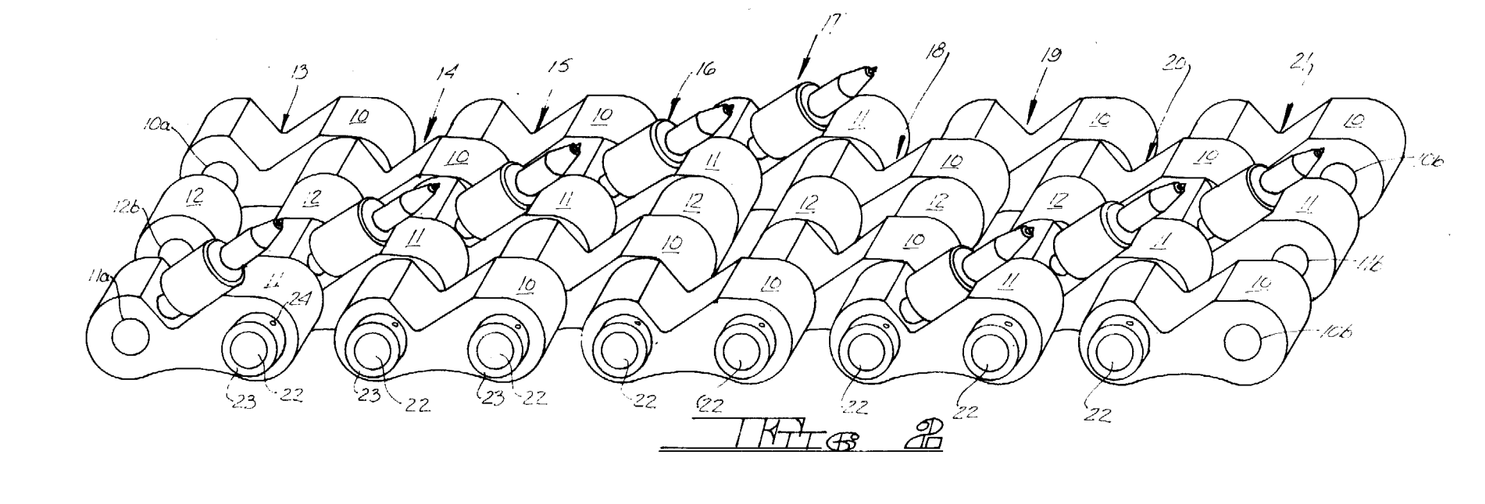
FIG. 2 is an isometric view of a typical prior art trim chain.

FIG. 2 illustrates a portion of a prior art trim chain of the type taught in the above mentioned U.S. Pat. No. 3,679,265 which may serve as the trim chain 9 of FIG. 1. The trim chain of FIG. 2 is made up of connecting links 10 and cutter bit carrying links 11. At selected positions in the chain, cylindrical spacer means 12 may be used in place of connecting links. The chain elements 10, 11 and 12 are arranged in transverse groups generally indicated at 13 through 21. The link elements 10 and 11 have perforations 10a and 11a at their rearward ends and perforations 10b and 11b at their forward ends. It will be evident from the endmost groups in FIG. 2 that the perforations of the link elements of the groups are in coaxial alignment. The same is true of the perforation 12b of the spacer member 12 (see group 13, FIG. 2). The ends of the link elements of each group are in interdigitated relationship with the ends of the link elements of the adjacent group and are held together by connecting pins 22 passing through the coaxial perforations in the link elements and spacer members.

To prevent axial movement of the connecting pins 22, their ends may be threaded and adapted to receive nuts 23. The nuts 23 are, themselves, maintained in proper position by locking pins 24 passing through coaxial perforations in the nuts and the connecting pins. The locking pins 24 may be in the form of roll pins or the like. The other ends of the connecting pins 22 (not shown) may be similarly provided with nuts and locking pins, or they may be provided with integral heads, annular shoulders or the like.

Finally, it is usual practice to drive the chain of FIG. 2 at one end thereof by means of driven sprocket wheels, supporting the other end of the chain on idler sprocket wheels. The driven and idler sprocket wheels may engage selected ones of the link elements at predetermined positions betweens the ends of the connecting pins 22, or they may engage the nuts 23. It will be evident from FIG. 2 that the nuts 22 will be subject to wear from contact with the material being cut and will be additionally subject to wear if they are engaged by the driven and idler sprocket wheels. It will also be evident that to remove a connecting pin 22 it is first necessary to remove a locking pin 24 and then the nut 23.

Figure 3:
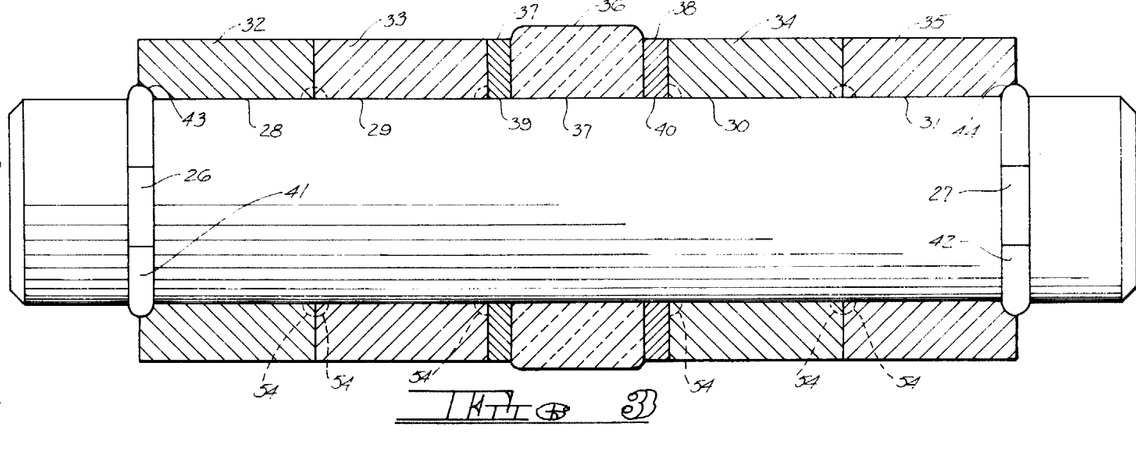
FIG. 3 is an elevational view, partly in cross section, illustrating a chain similar to that of FIG. 2 but provided with an embodiment of the connecting pin and retaining means of the present invention.

FIG. 3 illustrates a simple embodiment of the present invention. A connecting pin is shown at 25. The connecting pin has, near its ends, annular notches 26 and 27. The pin 25 is shown located in the coaxial perforations 28 through 31 of link elements 32 through 35. As indicated above, the term "link element" is intended to be construed broadly, and the elements 32 through 35 may be connecting links, bit carrying links or spacer elements. The arrangement and number of the link elements 32 through 35 does not constitute a limitation of the present invention. For purposes of an exemplary illustration, FIG. 3 shows four such link elements.

Also mounted on connecting pin 25 there is a cylindrical spacer member 36 having a central perforation 37. The spacer number 36 is made up of resilient material such as rubber or the like. Adjacent the spacer member 36 there are two protective rings 37 and 38 having central perforations 39 and 40, respectively. The protective rings 37 and 38 are adapted to prevent wear of the resilient spacer 36 by the adjacent link elements 33 and 34, since the link elements and resilient spacer are rotatively mounted on the connecting pin 25. While not required, the protective rings 37 and 38 may be vulcanized to or otherwise affixed to the resilient spacer 36.

Figure 4:
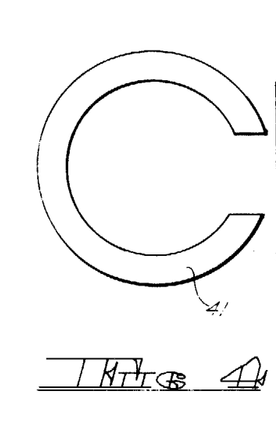
FIG. 4 is a side elevational view of one of the retaining rings of FIG. 3.

FIG. 3 also illustrates a pair of identical, split metal retaining rings 41 and 42 located into the annular connecting pin notches 26 and 27, respectively. FIG. 4 shows the retaining ring 41. It will be noted that the retaining ring is simply a split metal ring of circular configuration and circular cross section. The retaining rings 41 and 42 are partially located in annular notches 43 and 44 in the endmost link elements 32 and 35, respectively. This arrangement serves two purposes. First of all, it assures that the retaining rings 41 and 42 cannot be accidentally dislodged during the cutting operation. Secondly, the retaining rings are protected from wear by driven and idler sprockets, the material being mined and the like.

The assembly of the structure of FIGS. 3 and 4 may be accomplished as follows. One of the two split retaining rings 41 and 42 is first placed on the connecting pin 25. For purposes of an exemplary description, it will be assumed that retaining ring 42 is first placed upon the connecting pin. The connecting pin is then caused to pass through the coaxial perforations of link elements 32 through 35, protective rings 37 and 38 and the resilient spacer element 36. Through the use of an appropriate tool, the elements 32 through 38 on the connecting pin are squeezed together, compressing the resilient spacer element 36 and shifting the endmost link element 32 axially along the pin 25 and away from the annular notch 26. While so compressed, the retaining ring 41 may be located in the annular notch 26. Upon release of the compressive force, the resilient spacer 36 will relax and the structure will be complete as shown in FIG. 3 with the retaining rings 41 and 42 in the notches 43 and 44 of the adjacent link elements 32 and 35. The pin 25 may be removed for purposes of replacement of any of the elements thereon simply by once again exerting the compressing force and removing one or the other of the split metal rings 41 and 42.

The resilient spacer 36 may be of such width that when the structure of FIG. 3 is fully assembled, the elements 32 through 38 will just nicely take up the length of the pin 25 between the retaining rings 41 and 42. On the other hand, the resilient spacer 36 may be slightly oversized so that when the structure of FIG. 3 is fully assembled, the resilient spacer 36 will remain preloaded or partly compressed (as shown) so that it will take up or accommodate for wear on any or all of the elements during the cutting operation.

The structure of FIG. 3 constitutes a perferred embodiment in that with the provision of two split metal retaining rings 41 and 42 the pin 25 may be installed or removed from either side of the trim chain. It will be evident to one skilled in the art, however, that either the annular notch 26 and its split metal ring 41 or the annular notch 27 and its split metal ring 42 could be eliminated and replaced by an annular, integral shoulder (or head) on the pin 25. To this end, in FIG. 3, the retaining ring 41 or the retaining ring 42 could be considered as being an illustration of such an integral, annular shoulder. When such an annular shoulder is provided, the insertion and removal of the connecting pin 25 will otherwise be accomplished in the same manner described above.

Figure 5:
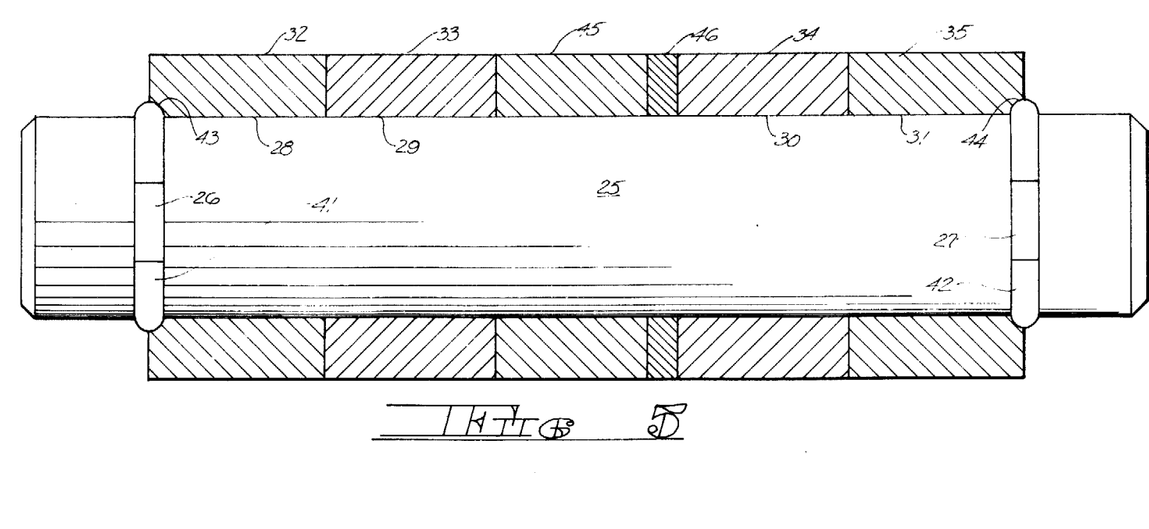
FIG. 5 is similar to FIG. 3 and is an elevational view, partly in cross section, illustrating another connecting pin and retaining means combination of the present invention.

FIGS. 5 and 6 illustrate another embodiment of the present invention. In FIG. 5 the connecting pin, annular notches, retaining rings and link elements are substantially identical to those shown in FIG. 3 and like parts have been given like index numerals. The structure of FIG. 5 differs from that of FIG. 3 in that the resilient spacer 36 and protective rings 37 and 38 have been eliminated and an additional link element 45 and a split metal spacing ring 46 have been substituted therefor. Again, the link element 45 may be in the form of a connecting link, a bit carrying link or a spacer. The split metal spacing ring 46 is shown in FIG. 6. While it may comprise simply a ring of circular configuration, it is preferable to provide it with a somewhat crescent shaped configuration and a circular inner surface (as shown) for purposes of strength since its ends must be spread to mount the spacer on or remove it from the connecting pin 25. The spacer 46 may have a rectangular cross section as shown in FIG. 5.

The assembly of the structure of FIG. 5 is accomplished in the following manner. Retaining ring 42 is located in notch 27 and the connecting pin 25 is caused to pass through the coaxial perforations in the link elements 32 through 35 and the additional link element 45. Since these link elements, alone, do not fill up the space between the annular notches 26 and 27, they may be shifted toward the retaining 42 so that notch 26 will be free to receive retaining ring 41. Once the retaining ring 41 is in place, the split metal spacer ring 46 may be affixed to the connecting pin 25 at any desired position, depending on the make-up of the chain. For purposes of an exemplary showing, it is illustrated as being located between link elements 34 and 45. The spacing ring 46 is of such width that it, together with the link elements will just nicely take up the full length of the connecting pin 25 between its annular notches 26 and 27. The structure of FIG. 5 will function in the same manner described with respect to the structure of FIG. 3 and will possess the same advantages. It will be noted that the spacing ring 46 has a greater gap than the retaining ring 41 since no annular notch on the connecting pin 25 is provided for it.

The embodiment of FIG. 5 may be dismantled simply by removal of the split metal spacer ring 46. This will enable the link elements 32 through 35 and 45 to be shifted in one direction or the other enabling removal of the desired one of split metal retaining rings 41 and 42. Again it will be understood that an integral, annular shoulder may be substituted on connecting pin 25 for one or the other of the split metal retaining rings, as discussed with respect to the structure of FIG. 3.

It will be noted from FIG. 6 that the ends of spacer 46 each terminate in a pair of surfaces designated 46a, 46b, 46c and 46d, respectively. When the spacer 46 is to be mounted on the connecting pin 25, this may be accomplished by one or more blows applied to the spacer. During the mounting process, end surfaces 46b and 46d tend to cam the ends apart.

Figure 12:
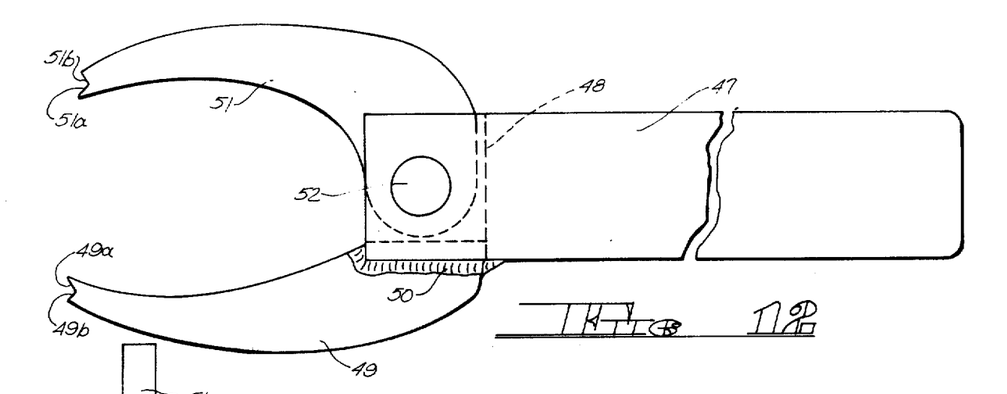
FIGS. 12 and 13 are respectively side elevational and end elevational views of a tool for the removal of the spacer ring of FIG. 6.
Figure 13:
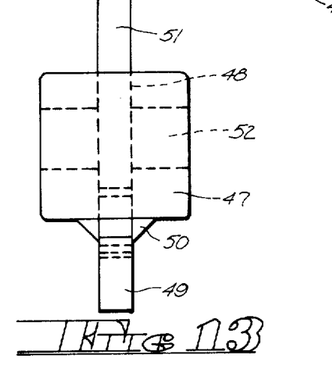

Removal of the spacer 46 may be accomplished by any appropriate means. A tool to facilitate removal of the spacer is illustrated in FIGS. 12 and 13. The tool comprises a handle portion 47 having at one end a transverse slot 48. An arcuate jaw 49 has one end partially located in the slot 48 and is permanently affixed to the handle 47 by any suitable means such as welding (indicated at 50). A second arcuate jaw 51 has one end pivotally mounted in the slot 48 by means of pivot pin 52.

The jaw 49 has its free end notched, forming surfaces 49a and 49b. In similar fashion, movable jaw 51 has its free end notched forming surfaces 51a and 51b. In describing the removal of spacer 46, reference is made to FIGS. 5, 6 and 12. The tool of FIG. 12 is so located with respect to the spacer 46 that jaw surfaces 49a and 51a each engage one of the spacer end surfaces 46a and 46c. Jaw surfaces 49b and 51b engage the adjacent peripheral surface of the spacer. Appropriate blows to the end of handle 47 will force the spacer ends to spread apart resulting in the removal of the spacer from connecting pin 25. The fact that jaw 51 is pivotally mounted, will insure that both jaws 49 and 51 will remain in contact with the ends of the spacer during the removal process. The interaction of the notched ends of jaws 49 and 51 and the corresponding surfaces on the ends of the spacer will assure positive engagement of the spacer by the jaws during the removal procedure.

Figures 7, 8, 9:
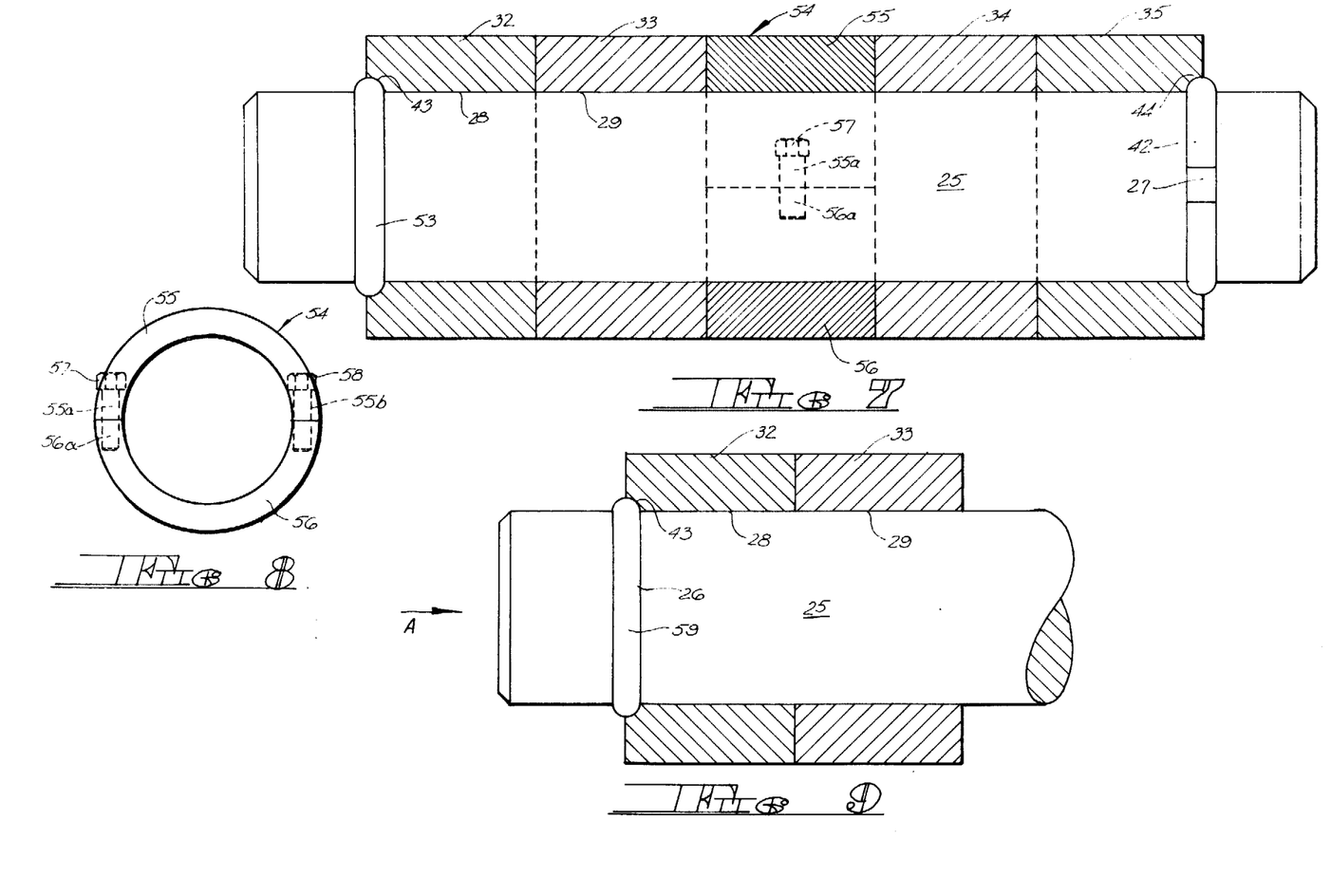
FIG. 7 is a view similar to FIGS. 3 and 5 and is an elevational view, partly in cross section, illustrating another embodiment of the present invention.
FIG. 8 is a side elevational view of the spacing means used in the embodiment of FIG. 7.
FIG. 9 is a fragmentary, elevational view partly in cross section and illustrating yet another embodiment of the present invention.
Figure 9:
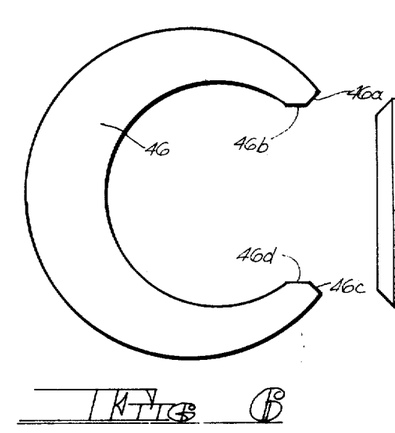

FIGS. 7 and 8 illustrate another embodiment of the present invention, and like parts have been given like index numerals. For purposes of an exemplary showing, in the embodiment of FIG. 7 an integral, annular shoulder 53 has been substituted for the annular notch 26 and retaining ring 41 of FIG. 5. It will be understood that the embodiment of FIG. 7 could have an annular notch and retaining ring rather than the integral shoulder 53 if desired. The structure of FIG. 7 further differs from that of FIG. 5 in that additional link element 45 and split metal spacer ring 46 have been replaced by a two-piece spacer generally indicated at 54. The spacer 54 is shown in FIG. 8 and comprises a cylindrical spacer member, the body of which is made up of two halves 55 and 56. The halves 55 and 56 have coaxial threaded perforations 55a—56a and 55b—56b therein for the receipt of bolts or machine screws 57 and 58, by which the body halves 55 and 56 may be joined.

Removal and installation of the connecting pin 25 may be accomplished in substantially the same manner described with respect to the embodiment of FIGS. 5 and 6 with the exception that the two-piece spacer 54 is used, rather than the split metal spacing ring 46. It will be understood that the two-piece spacer 54 is of such width as to cause it and the link elements 32 through 35 to just nicely take up the distance between the shoulder 53 and the annular notch 27. The spacer 54 may be located at any desired position along the connecting pin 25 between any of the link elements 32 through 35, depending on the make-up of the chain.

FIG. 9 illustrates yet another embodiment of the present invention. The structure is similar to that shown in FIG. 3 and like parts have been given like index numerals. In FIG. 9 only one end of the connecting pin 25 is shown, it being understood that the other end is identical. The connecting pin is provided with annular notches near each end, one of which is shown at 26. Each of these annular notches is adapted to receive a full retaining ring of resilient material, one of which is shown at 59. The resilient retaining ring 59 is a full circular element of circular cross section.

In assembly of the structure of FIG. 9, the resilinct retaining ring 59 is first located in the annular notch 26 by stretching it over the end of the connecting pin 25. The connecting pin is then passed through the coaxial perforations of the various link elements of the chain, two of which are shown at 32 and 33. Again, the number and nature of the link elements do not constitute a limitation on the present invention. A force in the direction of arrow A is then applied to the end of the connecting pin 25, compressing the resilient retaining ring 59. The compressing of this retaining ring will clear the annular notch at the other end of the connecting pin and enable an identical retaining ring to be located therein. Thereafter, the force on connecting pin 25 is removed and both of the resilient retaining rings will assume their proper positions in the annular notches of the adjacent ones of the link elements. Removal of connecting pin 25 is accomplished in a similar manner, the force in the direction of arrow A is again applied to the connecting pin compressing the resilient retaining ring 59. This will remove the resilient retaining ring at the other end of the connecting pin from the annular notch of the adjacent link element and enable its removal over the end of the connecting pin. The connecting pin may then be withdrawn from the coaxial perforations of the link elements.

Figure 10:
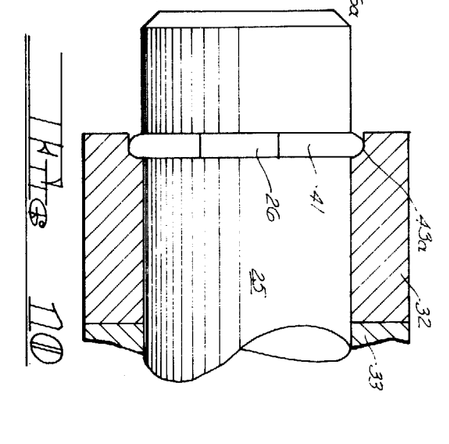
FIG. 10 is a fragmentary elevational view, partly in cross section, illustrating a retaining ring similar to that of FIG. 4 fully embedded in an annular notch in the adjacent chain link element.

FIG. 10 is similar to FIGS. 3, 5 and 7 and is a fragmentary showing of the end of a connecting pin. Again, like parts have been given like index numerals. The connecting pin 25 has near its end an annular groove 26 adapted to receive a split metal retaining ring 41. Mounted on the connecting pin 25 there are shown chain link elements or spacer elements 32 and 33.

The embodiments of FIG. 10 differs from that of FIG. 3 in that the annular notch 43a of link member 32 in FIG. 10 is deeper than the notch 43 in FIG. 3. The notch 43a is of a depth substantially equal to the width of retainer ring 41 so that when in position, retainer ring 41 is wholly protected by the adjacent chain link 32. It will be understood that an identical structure may be provided at the other end of the connecting pin 25. Furthermore, a notch similar to notch 43a of FIG. 10 may be applied to any of the embodiments of FIGS. 3, 5 and 7.

Figure 11:
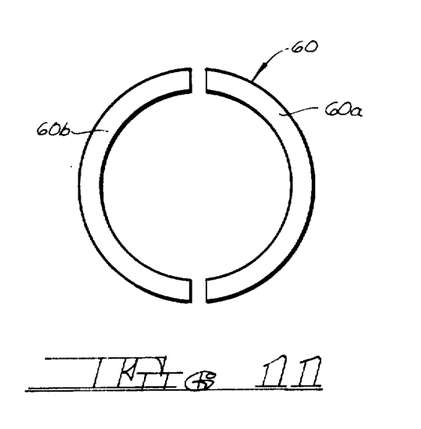
FIG. 11 is an elevational view of a two-piece retaining ring which may be substituted for the retaining ring of FIG. 4.

FIG. 11 shows an alternative form of retaining ring adapted to serve the same purpose as retaining ring 41 of FIG. 4. In this instance, the retaining ring is generally indicated at 60 and comprises two separate ring halves 60a and 60b. When the ends of ring halves 60a and 60b are placed adjacent each other, a full circular ring results. The two-piece ring of FIG. 11 may be used with the embodiments of FIGS. 3, 5 and 7 when notches 43 and 44 are of sufficient depth to assure that ring halves 60a and 60b will be properly maintained in place. The retaining ring 60 is particularly adapted for use with the embodiment of FIG. 10 wherein the ring halves 60a and 60b will be fully received within the deep annular notch 43a. The retaining ring 60 has the advantage that no tool is required to locate the ring in or remove the ring from the annular notches 26 and 27 of the connecting pin 25.

Figure 14:
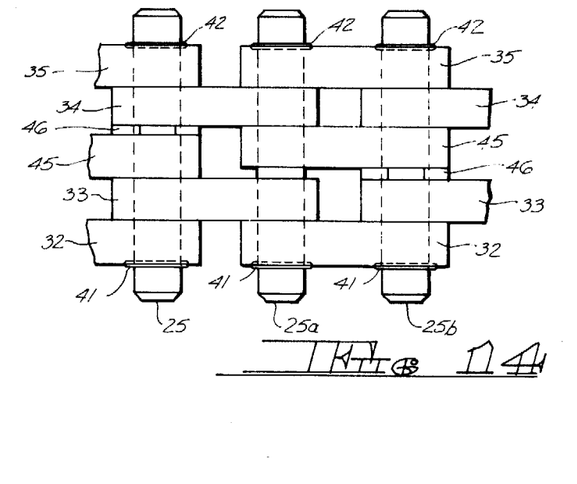
FIG. 14 is a fragmentary plan view of a chain utilizing the connecting pin and retaining means assemblies of the present invention and illustrating the use of spacer means on selected ones of the connecting pins.

FIG. 14 is a fragmentary view of a chain assembled in accordance with the present invention. In FIG. 14, a connecting pin 25 is shown, together with various link elements identical to that shown in FIG. 5 and like parts have been given like index numerals.

FIG. 14 further illustrates connecting pin 25a and connecting pin 25b. These connecting pins are substantially identical to connecting pin 25. With respect to the link members 32 through 35 and 45, some of them may be bit carrying link members but for purposes of clarity this is not shown. In FIG. 14 retaining rings 41 and 42 of the type shown in FIG. 3 are illustrated. However, it will be understood that any of the retaining ring-notch embodiments of the present invention may be used, including those of FIGS. 9, 10 and 11.

The purpose of FIG. 14 is to illustrated that it is not necessary to apply a spacer to all of the connecting pins 25, 25a and 25b. In the Figure, a spacer 46 (identical to that shown in FIG. 6) is shown on connecting pin 25. A similar spacer 46 is shown on connecting pin 25b. However, connecting pin 25a is without a spacer. It has been found that the spacers 46 on connecting pins 25 and 25b will also serve to maintain the proper spacing of the link elements on connecting pin 25a. In order to remove connecting pin 25a, it will be necessary to remove the spacer 46 on one of the adjacent connecting pins 25 and 25b. It will also be understood by one skilled in the art that the same phenomenon illustrated in FIG. 14 will hold true if spacers of the type shown in FIGS. 3, 7 and 8 are used.

Figure 15:
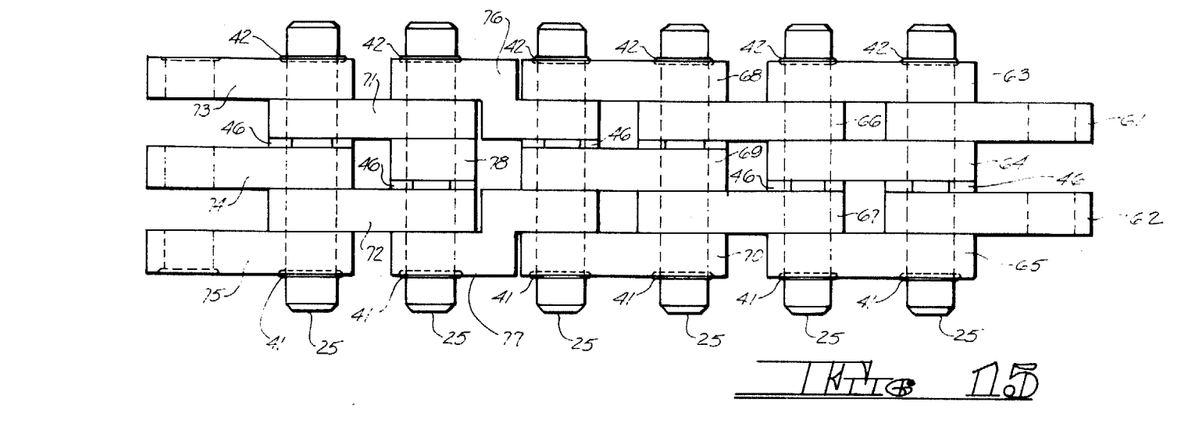
FIG. 15 is a plan view of a chain utilizing the connecting pin and retaining means assemblies of the present invention and showing special links enabling adjustment of the length of the chain.

FIG. 15 is a plan view of a portion of a chain assembled in accordance with the present invention. While the chain may be of any of the types described above, for purposes of an exemplary showing, it is illustrated as being generally of the type shown in FIG. 5. To this end, a plurality of connecting pins 25 are shown. The connecting pins 25 each bear a spacer member 46 (see FIG. 6) and retaining rings 41 and 42 (see FIGS. 3 and 4). Again it will be understood that any of the spacer member and retaining ring assemblies of the present invention may be used.

For purposes of the present explanation, the ordinary link members making up the chain are consecutively numbered from 61 through 75. As indicated above, selected ones of these link members may carry cutter bits and cutter bit mounting menas, but these have not been shown.

Chains of the type to which the present invention is directed, particularly when applied to mining machines or the like, are subject to considerable stress and wear. One of the ways in which the chain wear manifests itself is in an elongation of the chain. This is due primarily to an enlargement of the coaxial perforations in the chain link ends and wear on the connecting pins 25. It is normal procedure to provide the mining machine with take-up means to accommodate for the lengthening of the chain. However, when the maximum take-up adjustment of the mining machine has been employed, there generally has not been a sufficient elongation of the chain to permit removal from the chain of one chain unit. In the embodiment of FIG. 15 the term "chain unit" refers to a pair of adjacent chain link groups of two and three links respectively and the connecting pin joining the adjacent groups. Thus, in FIG. 15 chain links 61 through 65 and the intervening connecting pin 25 would constitute a chain unit. Similarly, chain links 66 through 70 and the joining connecting pin 25 would constitute a chain unit.

When such wear occurs, it is common practice to replace the entire chain, despite the fact that the chain may still possess a considerable service life. In order to take advantage of this remaining service life, a chain group may be replaced by a pair of special shortening links 76 and 77 and a cylindrical spacer member 78. The link 76 has a Z-shaped configuration and the outermost surface thereof may have an annular notch to accommodate one of the retaining rings 42. The link 76 directly joins two of the connecting pins 25 which would (when the chain was new) normally have an additional connecting pin 25 therebetween. The link 77 may be identical to the link 76, or depending upon the requirements of the chain, may be a mirror image thereof. Finally, the cylindrical spacer 78 (substantially identical to the cylindrical spacers 12 of FIG. 2) will be substituted for the intermediate chain link of the group of three in the chain unit removed.

As indicated above, the shortening links 76 and 77 may be used with any of the chain embodiments taught in the present application. If the chain is wider than that shown in FIG. 15, i.e., made up of groups having more than two and three links, respectively, additional ones of the links 76 and 77 and spacer member 78 may be used as required.

Figure 16:
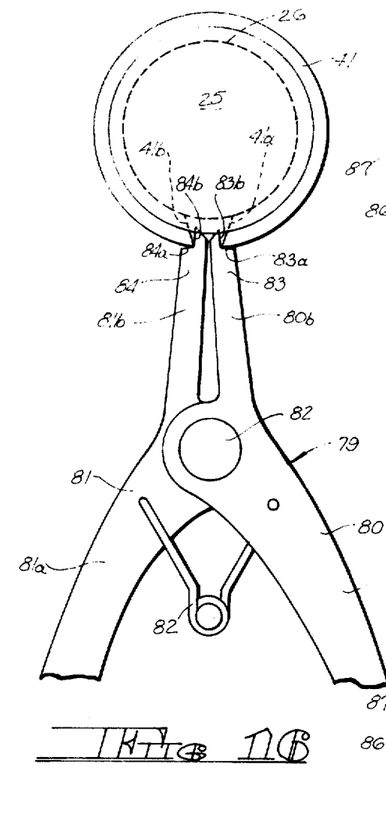
FIG. 16 is an end view of a connecting pin similar to those of FIGS. 3, 5, 7 or 11 and a fragmentary elevational view of a tool for removal of the retaining ring from the annular notch of the connecting pin.

The split metal retaining rings of FIGS. 3 through 5, 7 and 10 may be located in and removed from the annular notches 26 and 27 of the connecting pins by any appropriate means. One such means is illustrated in FIG. 16. In that Figure the split metal ring 41 is shown mounted in the notch 26 of a connecting pin 25. The Figure also illustrates a pliers-type tool generally indicated at 79. The tool is made up of two basic parts 80 and 81 pivoted together as at 82. The part 80 has a handle portion 80a and a jaw portion 80b. Similarly, the part 81 has a handle portion 81a and a jaw portion 81b. Spring means 82 may be provided having its ends affixed to the parts 80 and 81, respectively, to bias the parts to the position shown. The jaw portion 80b terminated in an end 83 notched to form surfaces 83a and 83b. Similarly, the jaw portion 81b terminates in an end 84 notched to form surfaces 84a and 84b. While not required, the ends of the retaining ring 41 and preferably formed with sloping surfaces, as shown at 41a and 41b.

To remove the split metal ring 41 from the annular connecting pin notch 26, it is only necessary to engage the ring 41 with the tool 79 in the manner illustrated. A squeezing of handle portions 80a and 81a of the tool toward each other will result in a separation of the tool jaw portions 80b and 81b. This, in turn, will provide an expansion of ring 41 to the extent that it may be slipped over the end of connecting pin 25. The jaw and surfaces 83b and 84b of the tool and the surfaces 41a and 41b of the ring will cooperate to assure that there is firm engagement of the ring by the tool even when the ring is in expanded condition, to prevent slippage of the ring from the tool and possible injury thereby. To relocate the ring 41 on the connecting pin 25, it is only necessary to repeat the process, expanding the ring to the point where it will slip over the end of the connecting pin 25 to the annular notch 26, after which it may be permitted to contract into the annular notch 26 and the tool 79 may be removed.

Figure 17:
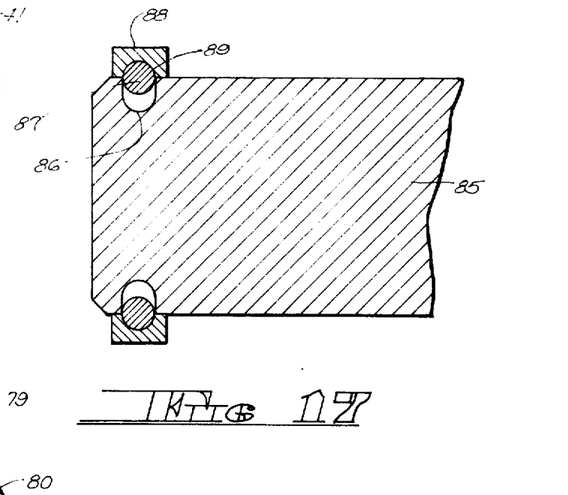
FIGS. 17, 18 and 19 are fragmentary cross sectional views of the connecting pin of the present invention and embodiments of the retaining means comprisisng retaining rings and cooperating sleeves.

FIG. 17 illustrates another embodiment of a retaining ring for a connecting pin of the present invention. A connecting pin is shown at 85 and may be substantially identical to the connecting pins 25 described above. Near its end, the connecting pin 85 has an annular notch 86. The annular notch is adapted to receive a retaining ring 87 which may be similar to the retaining ring 41 of FIG. 4 with the exception that it normally has an internal diameter slightly greater than the diameter of connecting pin 85.

The final portion of the retaining means of FIG. 17 comprises a protective sleeve 88. The sleeve is a full circular member having an internal diameter substantially equal to the diameter of connecting pin 85. The sleeve 88 has on its inner surface an annular notch 89 which extends completely about its inner surface.

The annular notch 86 in the connecting pin and the split metal ring 87 are so proportioned with respect to each other that by means of an appropriate pliers-like tool the split metal ring may be compressed so as to lie wholly within the annular notch 86. This having been done, the sleeve 88 may be inserted on the end of connecting pin 85 to the position shown in FIG. 17. When in this position, the split metal ring 87 will snap into the sleeve notch 89.

It will be evident from FIG. 17 that when the split metal ring 87 and the sleeve 88 are in engagement as shown, the endmost chain link (not shown) may abut the sleeve 88 and the split metal ring and sleeve will prevent axial shifting of the connecting pin 85. As with those embodiments described above, the connecting pin 85 may have at its other end a similar split metal ring-sleeve arrangement or an integral shoulder or head. The split metal ring 87 in FIG. 17 is illustrated as being of circular cross section and having approximately ½ of its cross section received within the annular notch 89 or sleeve 88. When half or more of the cross sectional area of split metal ring 87 is received within notch 89, it will be necessary to break the sleeve 88 with an appropriate tool to remove connecting pin 85 for chain repair or the like.

Figure 18:
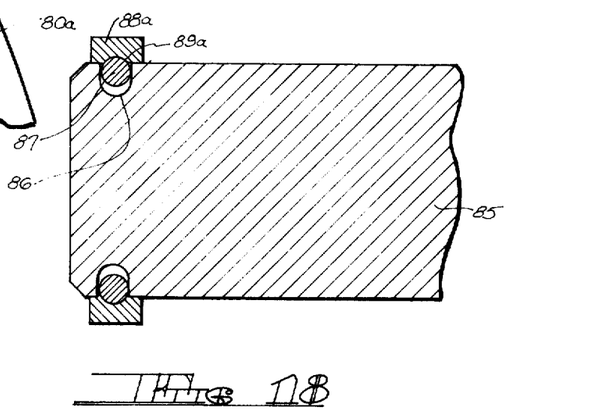

FIG. 18 illustrates a structure similar to FIG. 17 and like parts have been given like index numerals. In this instance, the split metal ring 87 is again illustrated as being of circular cross section. However, the notch 89a of the sleeve 88a is so configured as to receive less than half of the cross sectional area of the split metal ring. In this instance, the abutting surfaces of the split metal ring and the sleeve notch will cooperate with a camming action enabling the sleeve 88a to be pried off the end of connecting pin 85 for chain repair or the like. The amount by which the split metal ring 87 extends into the sleeve notch 89a (provided it is less than half of the cross sectional area of the split metal ring) will govern the amount of prying force required to remove sleeve 88a.

The annular notch 89 of the sleeve 88 and the split metal ring 87 (see FIG. 17) may have any appropriate cross sectional configuration. For example, the split metal ring may be oval in cross section with the notch 89 having a matching configuration. However, if one-half or more of the split metal ring extends into the sleeve notch, the parts will be permanently locked and the sleeve 88 will have to be broken for release of the split metal ring.

Figure 19:
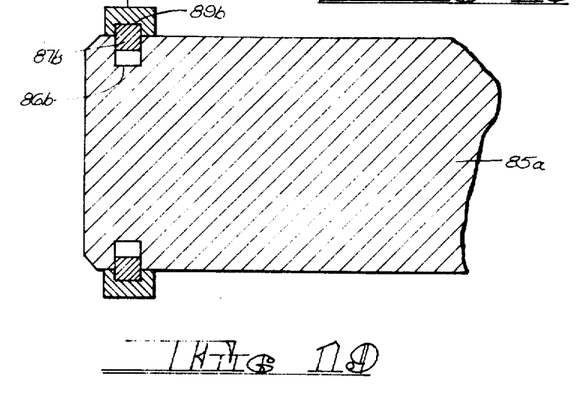

In FIG. 19, like parts have again been given like index numerals. The structure of FIG. 19 differs from that of FIG. 17 primarily in that the split metal ring 87b is of rectangular cross section and the annular notches 86a and 89b in the connecting pin 85a and the sleeve 88b, respectively, have a corresponding cross sectional configuration. When a split metal ring of rectangular cross section is used, the sleeve 88b is permanently locked even if sleeve notch 89b receives less than half the cross sectional area of split metal ring 87b. Thus, the sleeve 88b must be broken for release of the split metal ring 87b.

Figures 20, 21:
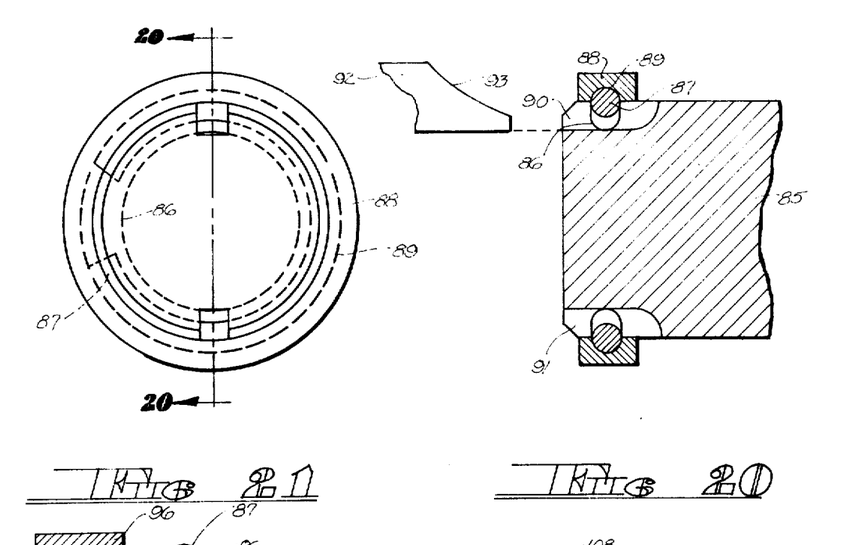
FIG. 20 is a fragmentary cross sectional view similar to FIG. 17 and illustrating means for the removal of the resulting ring-sleeve assembly.
FIG. 21 is an end view of the structure of FIG. 20.

FIGS. 20 and 21 are substantially identical to FIG. 17 and like parts have been given like index numerals. In an instance where it is desired that the sleeve 88-split metal ring 87 structure be permanently locked, FIGS. 20 and 21 illustrate a simple way in which the sleeve 88 may be broken to release the split metal ring 87 and therefore the connecting pin 85. To this end, the connecting pin 85 is provided with one or more longitudinal notches 90 and 91. While one such notch will suffice, for purposes of an exemplary showing the connecting pin 85 is illustrated as having two diametrically opposed notches.

The forwardmost end of a drift or other appropriate tool is shown at 92. The drift 92 has an end engagement surface 93 sloping rearwardly and upwardly. As will be evident from FIG. 20, if the drift 92 is inserted in either of the notches 90 or 91, the ring 87 will be engaged by the drift surface 93. Appropriate blows applied to the drift will force the ring 87 to expand to a point where the sleeve 88 will break. The innermost ends of notches 90 and 91 in the connecting pin are illustrated as curving upwardly and outwardly. While not required, this may in part be the result of the way in which the notches were formed, these rearward surfaces will cooperate with the drift to assist in expanding the ring 87 and breaking the sleeve 88. It will be understood that notches 90 and 91 may be applied with equal facility to the embodiment illustrated in FIG. 19 and the embodiment illustrated in FIG. 22, next to be described.

Figure 22:
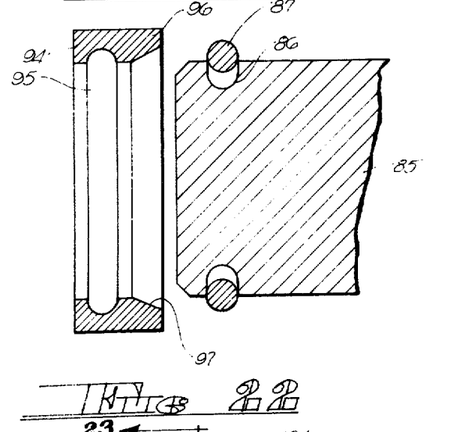
FIG. 22 is a fragmentary cross section view illustrating another embodiment of the retaining ring-sleeve assembly.

In FIG. 22 a connecting pin and split metal ring identical to those shown in FIG. 17 are illustrated, and like parts have been given like index numerals. An annular protective sleeve 94 is provided. The sleeve is similar to sleeve 88 of FIG. 17, having an annular notch 95 equivalent to the notch 89 of FIG. 17. The sleeve 94 differs primarily in that it has a slight annular extension 96 with a flaring inner surface 97. The surface 97 acts as a cam surface during installation of the sleeve 94 to facilitate compression of the split metal ring 87 during installation of the sleeve 94. It will be understood that the extension 96 and cam surface 97 of FIG. 22 may be applied to any of the embodiments illustrated in FIGS. 17 through 21.

Figure 23:
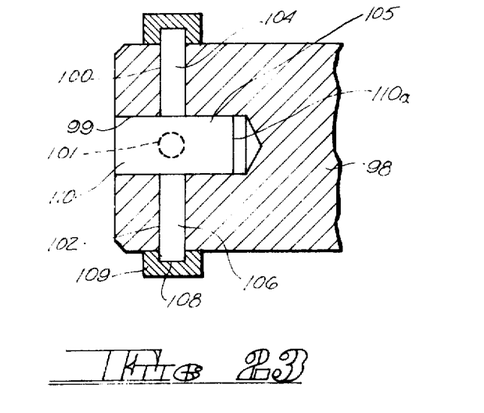
FIG. 23 is a fragmentary cross sectional view of the end of a connecting pin and illustrating another embodiment of the retaining means.
Figure 24:
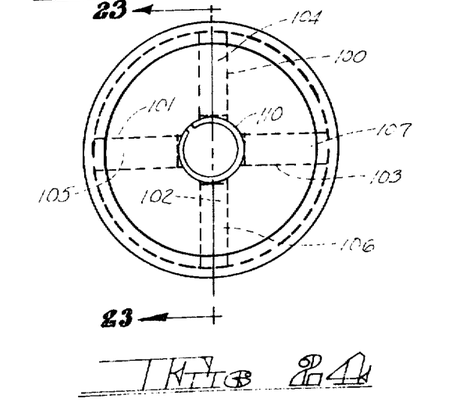
FIG. 24 is an end view of the structure of FIG. 23.

FIGS. 23 and 24 illustrate another embodiment of retaining means for a connecting pin. In these Figures, a fragmentary showing of the end of a connecting pin is indicated at 98. The end of the connecting pin has a central axial bore 99 and a plurality of radial bores extending from central bore 99 through the periphery of the connecting pin. In FIG. 23 and 24 four such radial bores are illustrated at 100 through 103.

In each of the radial bores 100 through 103 there is slidably mounted a pin. The pins are designated by index numerals 104 through 107.

The pins 104 through 107 are shiftable between retracted and extended positions. When fully retracted, portions of the pins are received in central bore 99 and the opposite ends of the pins do not extend beyond the periphery of connecting pin 98. In their extended position, the outermost ends of the pins protrude slightly beyond the periphery of connecting pin 98. In this position, they may be received in the notch 108 of a sleeve 109 similar to the sleeves described in the previous embodiments. When the pins are engaged in the sleeve notch, the sleeve and pins cooperate to form a retaining means to maintain the connecting pin 98 in position.

In order to maintain the pins 104 through 107 in their extended position, a large roll pin 110 may be inserted in the central bore 99. The central bore 99 may be slightly longer than roll pin 110 so that the roll pin may be removed by engaging its forwardmost end 110a (see FIG. 23) by any appropriate hook-like tool.

Figure 25:
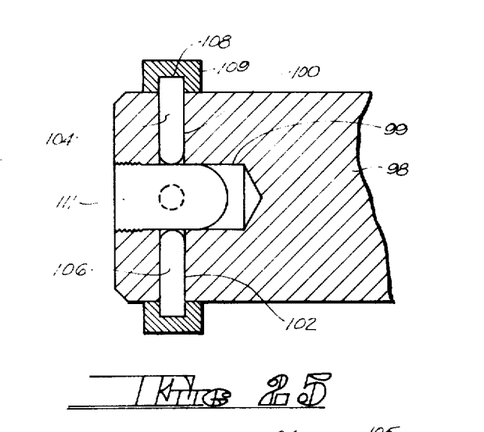
FIG. 25 is a fragmentary cross sectional view similar to FIG. 23 and illustrating a modified plug means.

FIG. 25 is substantially identical to FIG. 23 and like parts have been given like index numerals. The primary difference between the embodiment of FIG. 25 and that of FIG. 23 lies in the fact that the roll pin 110 has been replaced by a plug 111. The plug and a portion of the bore 99 may have threaded engagement. Furthermore, the plug may be provided with a screw slot or other means (not shown) to facilitate its insertion and removal.

In either of the embodiments 23 and 25 the innermost ends of pins 104 through 107 may be hemispherical or appropriately sloped to assist insertion of roll pin 101 or plug 111 and shifting of the pins 104 through 107 to their extended position. For the same reason, the forwardmost end of plug 111 may be tapered or hemispherical as shown in FIG. 25.

Modifications may be made in the invention without departing from the spirit of it. As indicated above, a connecting pin may be provided with any one of the retaining means embodiment of the present invention at one end or at both ends. If provided at both ends, the pin may be removed from either side of the chain. In instances where the retaining means of the present invention is applied to only end of the connecting pin, the other end of the connecting pin may have an integral, permanent shoulder or head.

Furthermore, in embodiments such as those shown in FIGS. 3, 5, 7, 9 and 10 it would be within the scope of the invention to provide some or all of the link elements with annular notches on one or both sides so that the link elements were truly interchangeable. This is indicated in dotted lines in FIG. 3, wherein the additional notches are designated by index numeral 112.

The embodiments of the invention in which an exclusive property or privilege is claimed are defined as follows:

1. In a chain of the type comprising a plurality of link elements arranged in groups one behind the other with the ends of the link elements of adjacent groups being in interdigitated relationship and having transverse perforations coaxially aligned, improved means to join said interdigitated link element ends of the each adjacent pair of said groups comprising an elongated connecting pin passing through said coaxially aligned perforations of said interdigitated ends, first and second retaining means comprising annular abutment means so positioned on said connecting pin near the ends thereof as to cooperate with the outermost link element ends on said connecting pin to prevent inadvertent removal of said connecting pin from said coaxial perforations, at least one of said retaining means being removable from said retaining position to permit removal of said connecting pin from said coaxial link element perforations, and means to protect said at least one removable retaining means from wear from external sources comprising an annular undercut at that end of said transverse perforation of said outermost link element end facing said at least one removable retaining means, said last mentioned retaining means being located in part at least in said annular undercut and means to releasably maintain said at least one removable retaining means in part at least within said undercut to protect said last mentioned retaining means and prevent its inadvertent removal from said annular undercut while permitting its purposeful removal therefrom for assembly and disassembly of said chain.

2. The structure claimed in claim 1 wherein said transverse perforation of each of said outermost link element ends on said connecting pin has an annular undercut facing its respective connecting pin end, said first and second retaining means both comprising annular abutment means so positioned on said connecting pin as to be each in abuttable relationship with one of said outermost link element ends and located in part at least in said annular undercut of the adjacent one of said outermost link elements and means to releasably maintain said first and second abutment means in part at least within said annular undercuts of their respective outermost link element ends to protect said first and second abutment means and prevent their inadvertent removal from their respective annular undercuts while permitting purposeful removal therefrom for assembly and disassembly of said chain.

3. The structure claimed in claim 2 wherein said first retaining means is removable and comprises a split metal ring having an inner diameter less than the diameter of said connecting pin and an outer diameter greater than the diameter of said connecting pin, said connecting pin having an annular notch near one end thereof, said split metal ring being removably affixed in said connecting pin notch, said second retaining means comprising an integral annular shoulder or head near the other end of said pin.

4. The structure claimed in claim 2 wherein said first and second retaining means are both removable and each comprises a split metal retaining ring having an inner diameter less than the diameter of said connecting pin and an outer diameter greater than the diameter of said connecting pin, said connecting pin having an annular notch near each end thereof, said split metal retaining rings being removably affixed in said annular notches in said connecting pin.

5. The structure claimed in claim 2 wherein each of said annular undercuts is of a depth substantially equal to the width of its respective one of said first and second retaining means whereby each of said first and second retaining means is wholly received within said annular undercut of the adjacent one of said outermost link elements.

6. The structure claimed in claim 2 wherein said first and second retaining means are removable and each comprises a retaining ring of circular configuration and made of resilient material located in an annular notch in said connecting pin, said resilient retaining rings being sufficiently stretchable to be placed over the ends of said connecting pin into their respective notches.

7. The structure claimed in claim 1 wherein said chain is a trim chain for a mining machine, selected ones of said link elements comprising tool carrying links.

8. The structure claimed in claim 1 wherein at least one of said retaining means comprises a full circular ring divided into two separable halves, said ring having an inner diameter less than the diameter of said connecting pin and an outer diameter greater than the diameter of said connecting pin, said ring halves being receivable in an annular notch in said connecting pin, said ring being received in said annular undercut in the adjacent one of said outermost link elements to a sufficient extent to maintain said ring halves in position in said annular connecting pin notch.

9. The structure claimed in claim 8 wherein said annular undercut in said adjacent one of said outermost link elements is so sized as to wholly receive said ring halves.

10. The structure claimed in claim 1 wherein said annular undercut is of a depth substantially equal to the width of said at least one removable retaining means whereby said retaining means is wholly received within said annular undercut of the adjacent one of said outermost link elements.

11. In a chain of the type comprising a plurality of link elements arranged in groups one behind the other with the ends of the link elements of adjacent groups being in interdigitated relationship and having transverse perforations coaxially aligned, improved means to join said interdigitated link element ends of each adjacent pair of said groups comprising an elongated connecting pin passing through said coaxially aligned perforations of said interdigitated ends, first and second retaining means comprising annular abutment means so positioned on said connecting pin near the ends thereof as to cooperate with the outermost link element ends on said connecting pin to prevent inadvertent removal of said connecting pin from said coaxial perforations, at least one of said retaining means being removable from said retaining position to permit removal of said connecting pin from said coaxial link element perforations, means to protect said annular retaining means from wear from external sources comprising an annular undercut at that end of said transverse perforation of each of said outermost link element ends facing its respective connecting pin end, said first and second retaining means being so positioned on said connecting pin as to each be in abutable relationship with the adjacent one of said outermost link element ends and located in part at least within said annular undercut of said adjacent one of said outermost link element ends and means to releasably maintain said first and second retaining means in part at least within said annular undercuts of their respective outermost link element ends comprising a compressible spacer of resilient material mounted on said connecting pin at a selected position between said outermost link element ends, said resilient spacer being of such width when relaxed as to releasably maintain said retaining means in part at least within their respective annular undercuts.

12. The structure claimed in claim 11 including a pair of protective metallic rings mounted on said connecting pin to either side of said resilient spacer.

13. The structure claimed in claim 11 wherein said resilient spacer is of such width as to be partially compressed when mounted on said connecting pin whereby to maintain said retaining means in abutting relationship with their respective outermost link element ends and to compensate for wear of said link element ends and said abutment means.

14. In a chain of the type comprising a plurality of link elements arranged in groups one behind the other with the ends of the link elements of adjacent groups being in interdigitated relationship and having transverse perforations coaxially aligned, improved means to join said interdigitated link element ends of each adjacent pair of said groups comprising an elongated connecting pin passing through said coaxially aligned perforations of said interdigitated ends, first and second retaining means comprising annular abutment means so positioned on said connecting pin near the ends thereof as to cooperate with the outermost link element ends on said connecting pin to prevent inadvertent removal of said connecting pin from said coaxial perforations, at least one of said retaining means being removable from said retaining position to permit removal of said connecting pin from said coaxial link element perforations, means to protect said annular retaining means from wear from external sources comprising an annular undercut at that end of said transverse perforation of each of said outermost link element ends facing its respective connecting pin end, said first and second retaining means being so positioned on said connecting pin as to be each in abutable relationship with the adjacent one of said outermost link element ends and located in part at least in said annular undercut of said adjacent one of said outermost link element ends and means to releasably maintain said first and second abutment means in part at least within said annular undercuts of their respective outermost link element ends comprising a spacer means mountable on and removable from said connecting pin without removal therefrom of said link element ends and said removable retaining means, said spacer means being locatable on said connecting pin at a selected position between said outermost link element ends thereon, said spacer being of such width as to releasably maintain said retaining means in part within their respective annular undercuts.

15. The structure claimed in claim 14 wherein said spacer means comprises a split metal ring.

16. The structure claimed in claim 14 wherein said spacer means comprises a cylindrical body having two halves parting along a plane passing through the axis of said cylindrical body and fastening means to hold said body halves together about said connecting pin.

17. The structure claimed in claim 15 wherein said split metal ring spacer means is crescent shaped, having a circular inner surface of such diameter as to just nicely receive said connecting pin.

18. In a chain of the type comprising a plurality of link elements arranged alternately in first and second groups one behind the other, all of said first groups containing equal numbers of link elements, all of said second groups containing equal numbers of link elements, each of said first groups containing one more link element than each of said second groups, each adjacent pair of first and second groups having the ends of their link elements in interdigitated relationship and having transverse perforations coaxially aligned with an elongated connecting pin passing therethrough joining said intedigitated link element ends and retaining means so positioned near the ends of said connecting pin to cooperate with the outermost link element ends on said connecting pin to prevent inadvertent removal of said connecting pin from said coaxial perforations, the improvement comprising shortening link element means whereby an adjacent pair of first and second groups and their joining connecting pin may be removed from the chain and the connecting pins of said first group adjacent said second group removed and said second group adjacent said first group removed may be joined directly together, said shortening link element means comprising at least a pair of shortening links joining said last mentioned connecting pins and at least one spacer mounted on said connecting pin for said second group adjacent said first group removed, said spacer comprising a cylindrical element having an axial perforation to receive said last mentioned connecting pin, said spacer having an axial length equal to the width of one of said chain link elements, said shortening links being of equal length, said shortening link length being less than the combined length of said first and second groups removed, each of said shortening links comprising a Z-shaped body so configured that one end of the body is offset laterally of the other end by a distance equal to the width of one of said chain link elements, said ends of said body each having a transverse perforation to receive the adjacent one of said connecting pins being joined directly together.

* * * * *